Sept. 9, 1941.  E. NIELSEN  2,255,080
GLASS WASHER
Filed Jan. 24, 1939   2 Sheets-Sheet 2
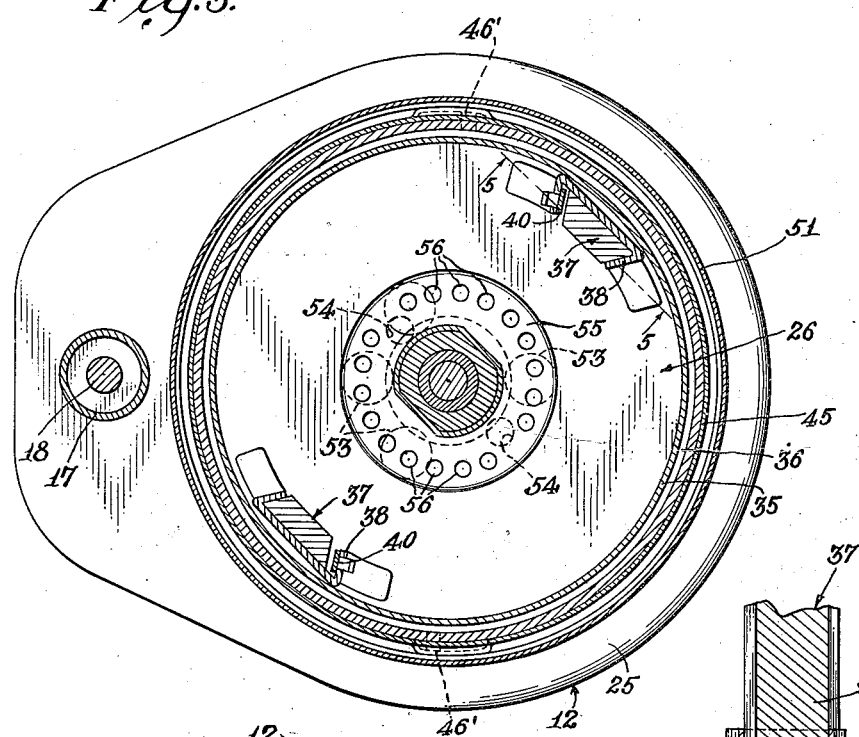
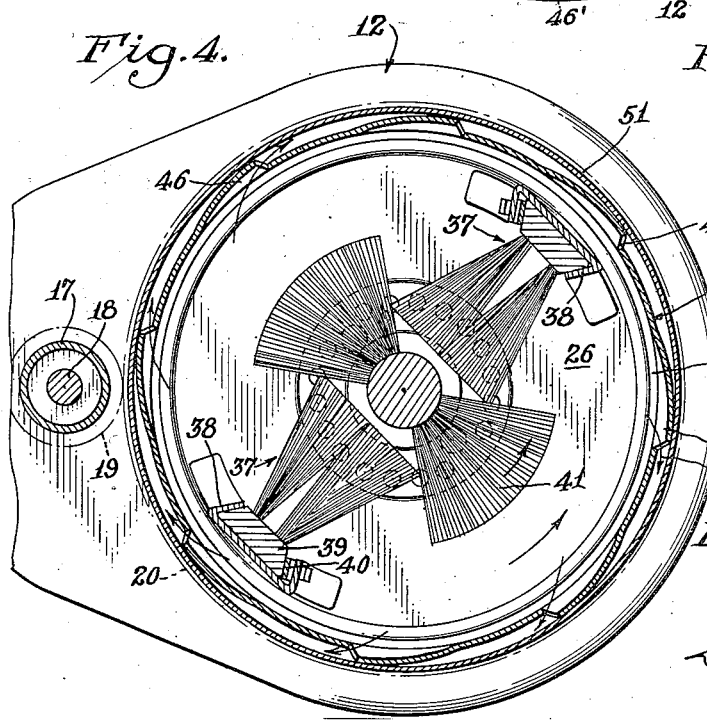
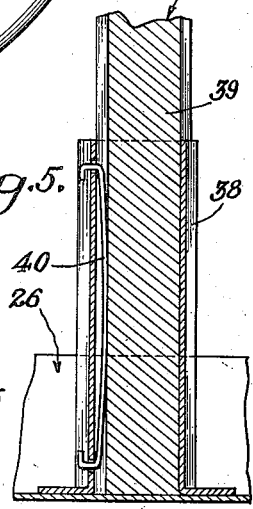
Inventor
Emanuel Nielsen
BY
Fred Bing
Attorney.

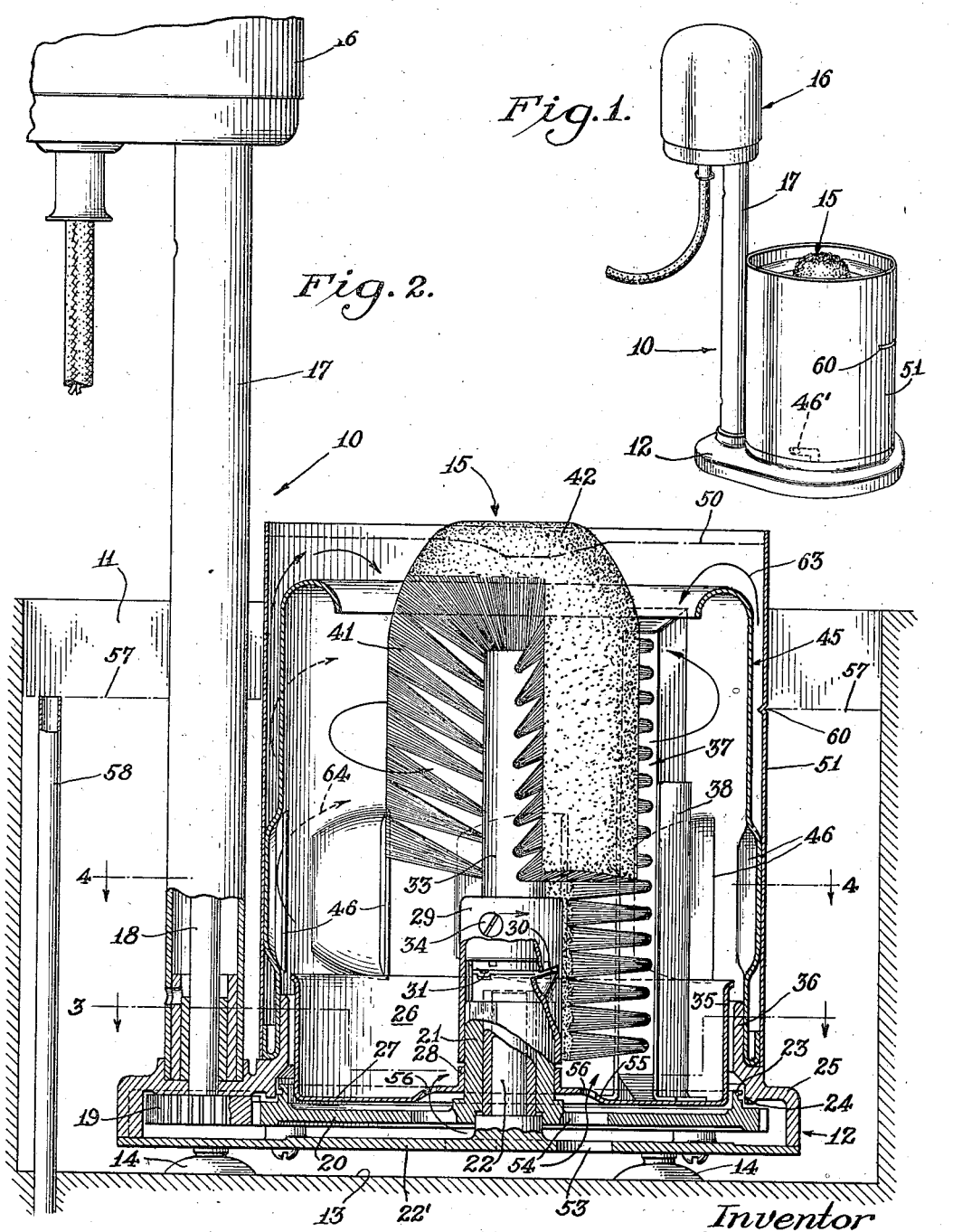

Patented Sept. 9, 1941

2,255,080

UNITED STATES PATENT OFFICE 2,255,080

GLASS WASHER

Emanuel Nielsen, Racine, Wis., assignor to Vincent W. Cunningham, Chicago, Ill.

Application January 24, 1939, Serial No. 252,637

1 Claim. (Cl. 15—76)

The invention relates generally to glass washers, and more particularly to glass washing devices wherein the inside and outside surfaces of the glass are scrubbed while the glass and the scrubbing means are substantially submerged in washing solution.

Since glasses are most conveniently scrubbed while in an inverted vertical position, the scrubbing means is normally mounted for rotation about a vertical axis, and due to the varying height of the glasses to be scrubbed, it is necessary that the water or washing solution be relatively deep in order to submerge brushing means of sufficient height to wash the wide variety of glasses encountered in commercial fountains or restaurants.

When the washer is of a type adapted for mounting in present washing tanks, it has been found that a large proportion of the commercial washing tanks are too shallow to provide for submergence of the desired length of brushing structure. Hence, for prior machines designed to afford proper washing of the desired range of glass sizes, the potential market has been greatly limited by the large proportion of shallow wash tanks in use throughout the country.

Many of the wash tanks encountered have a maximum water depth of but 5 or 6 inches, and the primary objective of the present invention is to provide a glass washing device of the brush type capable of properly washing the full range of glass sizes in such shallow sinks.

A further object is to provide such a glass washer wherein adequate circulation of washing solution through the brush structure is assured, despite the normally low or shallow water level in the wash tank.

Another object is to provide a glass washer of this character in which an elevated and substantially constant water level is established about the glass washing structure.

A further object is to provide such a device wherein the elevated water level is maintained with a minimum expenditure of power.

Another object is to produce a device of this character in which the water elevating means serves merely as a make-up means to maintain the elevated water level against leakage losses, and wherein a circulation of the elevated body of water is attained by other means independently of the water elevating means.

A further object is to provide a new and improved portable glass scrubbing machine capable of operation in washing tanks having a normal water level lying substantially below the upper ends of the brushing means.

Other objects and advantages will become apparent from the following description, taken in connection with the accompanying drawings, in which:

Fig. 1 is a perspective view of a portable glass washing device embodying the features of the invention.

Fig. 2 is an enlarged vertical sectional view showing the device of Fig. 1 positioned in a washing tank.

Fig. 3 is a plan sectional view taken along the line 3—3 of Fig. 2.

Fig. 4 is a plan section taken along the line 4—4 of Fig. 2.

Fig. 5 is a fragmental vertical section taken along the line 5—5 of Fig. 3.

In the form chosen for illustration herein the invention is embodied in a washer 10 of portable construction adapted to be readily and easily mounted in present wash tanks such as the tank 11 shown in Fig. 2. The washer 10 as herein shown is self-contained and unitary in construction, in that it comprises a base 12 adapted to rest on the bottom 13 of the tank 11 through the medium of suction cups 14; and on the base 12 there is mounted a rotary scrubbing means 15 and a driving means therefor, such as an electric motor 16 supported in an elevated position by a column 17 upstanding from one end of the base 12.

The brushing means 15 being rotary in character, a suitable rotary drive is provided therefor, comprising in the form illustrated, a suitable reduction gearing (not shown) in the lower end of the motor housing, which gearing drives a shaft 18 extending downwardly through the tubular column 17. At its lower end and within the base 12 the shaft 18 carries a pinion 19 and this pinion engages a main gear 20 also contained in the base. The gear 20 has an upstanding central sleeve or hub 21 which surrounds an upstanding central bearing stud 22 mounted in the removable lower wall 22' of the base 12.

The brushing means 15 is driven from the gear 20, and in the present case the base 12 has an open top over the gear 20 and the brushing means is mounted directly on the top of the gear 20 so as to reduce the over-all height of the brushing means and base. The gear 20 preferably has an upstanding annular flange 23 adjacent its periphery which runs with a small clearance in the annular opening 24 in the top wall 25 of the base. This small clearance prevents entry of injurious foreign matter into the gear chamber. As an additional safeguard against foreign matter, and particularly against broken glass, the present device has a glass pan 26 which overlies the upper face of the gear 20 and serves as a support for the elements of the brushing means, and as a driving connection from the gear 20 to the brushing means. Thus the glass pan 26 has a bottom wall 27 with a relatively short upstanding central sleeve 28 which slips down over the sleeve 21 of the gear 20 and has a complemental engagement with the flat sides thereof so as to be rotated with the gear 20. Above the sleeve 28, a brush-mounting collar 29 embraces the gear sleeve 21 and is held in place by a cam tooth 30 engaging a projecting element 31 on the gear sleeve 21. The brush mounting sleeve 29 has the lower end of a central brush core 33 fixed in its upper end by a screw 34.

At its outer edge the glass pan 26 has an upstanding annular wall 35 which runs closely within an upstanding annular ledge 36 surrounding the opening 24; and the upper edge of the wall 35 is turned outwardly over the upper edge of the ledge 36. The wall 35 in the present instance serves to support a plurality of outer brushes 37 by means of upstanding dovetail channels 38. The channels 38 are vertically positioned to receive the backs 39 of the brushes 37, and suitable spring means 40 is provided within each channel 38 to secure the brushes in position while allowing for expansion of the wood from which the backs are made. The bristles of the side brushes 37 project into the space between vertically extending rows 41 of bristles which project laterally from the central brush core 33; and the central brush core 33 also has a substantial tuft 42 of bristles at its upper end to assure proper scrubbing of the bottoms of the glasses.

About the brush structure 15, which is formed by the central brush and the side brushes 37, the illustrated device is provided with a cylindrical housing 45 which acts as a guard about the rigid moving parts of the brush structure 15. The housing 45 surrounds the ledge 36 and is locked thereto by lugs as indicated at 46' in Figs. 1 and 3. The housing 45 also functions to direct and control the circulation of water through the brush structure 15, and to this end it has a plurality of outlet openings spaced downwardly from the inturned upper end so that centrifugal force may act during rotation of the brushes to discharge water from the lower portion of the housing 45. Thus when the brush structure is submerged to a point above the upper edge of the housing 45, water flows continuously into the top of the housing 45 and is discharge from the openings 46. This provides for continuous flushing of the brushes as well as the glasses during the washing process.

Since the rotation of the brush structure tends to cause a substantial whirlpool centrally of the brush structure, the openings 46 are herein shown in the form of louvres directed reversely as respects the direction of rotation of the brush structure. Hence the reverse discharge of the water from openings 46, as indicated by the arrows in Fig. 4, causes the normal cavitation at the top of the brushes to be substantially overcome.

In accordance with the present invention the washer 10 is so constructed that the desired water level, above the top of the housing 45 is attainable automatically in wash tanks, which are of insufficient depth to permit normal submersion of this housing. This end is attained in such a manner that the normal circulation as above described is not disturbed or altered in any material respect. Thus there is provided means for supporting or enclosing a limited body of water about the housing 45 so that this body of water may extend to a level above the top of the housing 45 for circulation purposes, and means is provided for automatically elevating water to the required level within this supporting and enclosing means.

In the form herein shown the elevated water level, as at 50 (Fig. 2) is attained within an enclosure or cylindrical outer casing 51, which surrounds the housing 45 in spaced relation thereto, and extends upwardly beyond the top of the housing 45 to the required extent. This outer casing 51 may be filled and the water elevated therein by a variety of means, but it is desirable that this means provide for free communication of the interior of the casing 51 with the water in the main tank 11, whereby the water or washing solution in the tank all functions in the washing operation by being circulated through the casing 51. The rate of such circulation from the tank 11 into the casing 51 may, of course, be varied, but in any case, may be relatively slow.

In the present case the water is pumped to the elevated level 50 in the outer casing 51 by pumping means associated with the rotating brush structure 15. Thus the bottom wall 22' of the base 12 has a series of relatively large openings 53 formed therein as closely adjacent the axis of the stud 22 as possible, to permit entry of water, which water may pass on upwardly through a series of holes 54 formed in the web of the gear 20 adjacent the central hub 23 thereof. Above the holes 54, in an upwardly and inwardly sloping annular portion 55 of the bottom wall 27 of the pan 26, a plurality of holes 56 are formed, so that water in the tank 11 normally passes through these holes 53, 54, and 56 to fill the casing 51 to the level of the water in the tank. This level 57 is determined by means such as an overflow pipe 58.

When the gear 20, the pan 26, and the brush structure 15 are rotated by the motor 16 at a speed of from 250 to 350 R. P. M., the various rotating elements act as a centrifugal pump to draw water through the openings 53 and discharge this added water within the casing 51 and thereby elevate the water within the casing 51. The casing 51 is, in the present case, tightly fitted about the flanged lower end of the inner housing 45 so that there can be but slight leakage of water from this lower edge of the casing 51. Hence any excess of water pumped into the casing 51 will flow over the top of the casing 51. Ordinarily this overflow is but slight, and it serves merely as a means for gradually circulating all of the washing solution in the tank 11 through the casing 51. The rate of such overflow will of course vary with the brush speed, pump efficiency, and water level 57, but it is found that sufficient secondary circulation is attained when the level 57 in the main tank is at or above the mark 60 on the casing 51.

With such a water level 57 it is also found that the water in the casing 51 is elevated to the desired level 50 within a few seconds after starting the washer, so that there is practically no loss of time in the use of the present machine.

The secondary circulation due to overflow of water from the casing 51 has been described as being relatively slow, so that there is but little additional power required to attain this flow; and yet, in the present device, there is a vigorous flushing flow of fluid through the inner housing 45 and the brush structure whereby to wash away the dirt particles as they are loosened by the brushes. This vigorous flow also serves to clean the brushes themselves. In this primary circulation, the fluid flows into the top of the housing 45 as indicated by the arrow 63, downwardly through the brushes, and out of the louvres 46 as indicated by the arrows 64. Such circulation takes place, of course, even if the water level 57 is much higher than shown herein.

From the foregoing it will be evident that the present invention provides a glass washer which operates efficiently in wash tanks of a relatively shallow construction, whereby to increase the range of usefulness of devices of this character.

I claim as my invention:

A glass washer comprising in combination, a base, a brushing means rotatable about a substantially vertical axis, an open top cylindrical housing surrounding said brushing means and having openings in its sides spaced from the top thereof whereby water entering said open top may be discharged by the rotating brushes through said openings, a casing surrounding said housing in spaced relation thereto and extending to a point above the open top of said housing, pumping means located adjacent to the lower end of the brushing structure and having a pump inlet communicating through the base to the exterior of the washer and a pump outlet, said outlet discharging within said casing, whereby water enters said casing by gravity to the level of the water in the tank in which the washer is mounted, said casing being mounted on said base and being imperforate from said base to a level above the top of said housing so that the sole path of water flow between such a tank and the lower interior portion of said casing is through said pumping means, said pump being operable as an incident to the rotation of said brush structure to discharge water into said casing, whereby, when the washer is mounted in a tank having a normal water level too low to submerge said housing, said pump induces an elevated water level within said housing, the rotation of said brushing means being operable upon the water elevated by said pump within said casing to circulate the same repeatedly through said brushing means while said pump acts merely to replace the loss of water due to leakage or overflow from said casing.

EMANUEL NIELSEN.